No. 733,935. PATENTED JULY 21, 1903.
J. F. BARNETT, Jr.
VEHICLE WHEEL.
APPLICATION FILED JULY 10, 1902.
NO MODEL. 2 SHEETS—SHEET 1.

WITNESSES:
C. F. Kilgore
D. H. Kreinendahl

INVENTOR.
John F. Barnett Jr.
BY
ATTORNEYS.

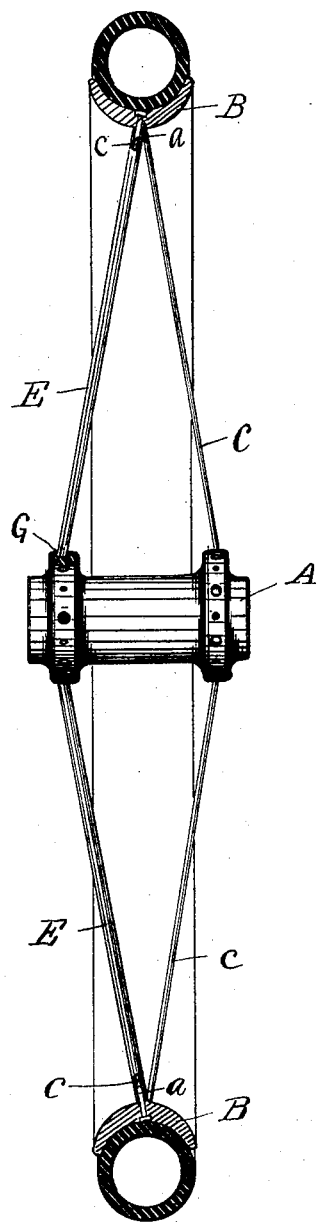

No. 733,935. Patented July 21, 1903.

UNITED STATES PATENT OFFICE.

JOHN F. BARNETT, JR., OF WEST SUFFIELD, CONNECTICUT.

VEHICLE-WHEEL.

SPECIFICATION forming part of Letters Patent No. 733,935, dated July 21, 1903.

Application filed July 10, 1902. Serial No. 115,024. (No model.)

*To all whom it may concern:*

Be it known that I, JOHN F. BARNETT, Jr., a citizen of the United States of America, residing at West Suffield, in the county of Hartford and State of Connecticut, have invented certain new and useful Improvements in Vehicle-Wheels, of which the following is a specification.

Figure 1:
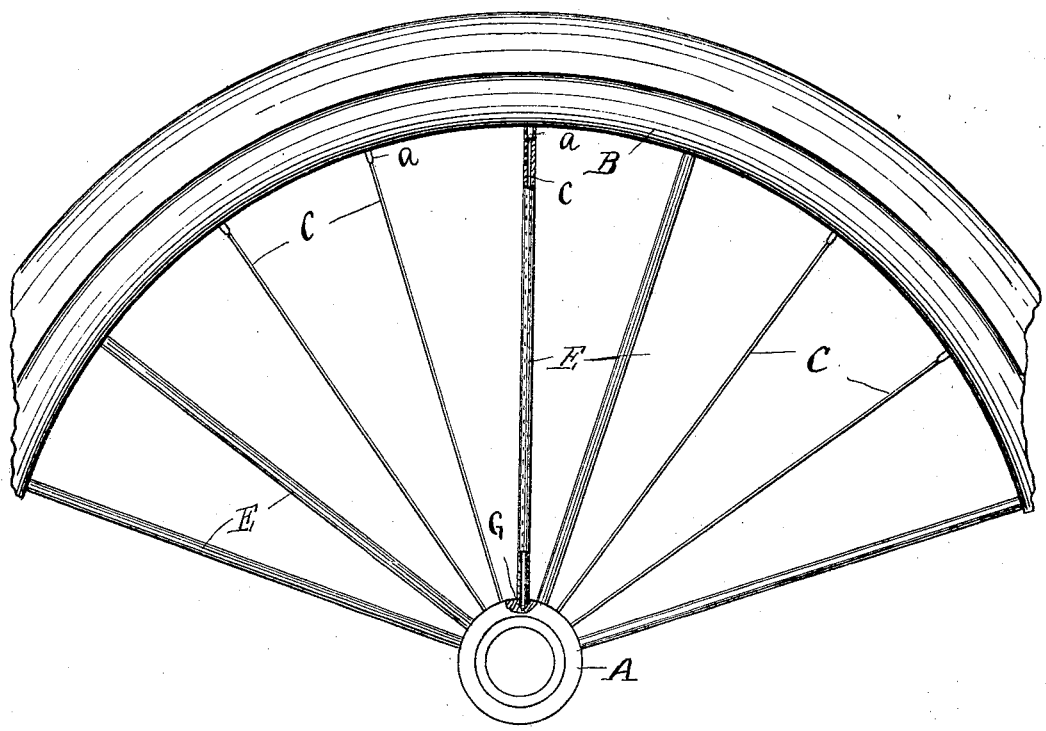
Figure 2:
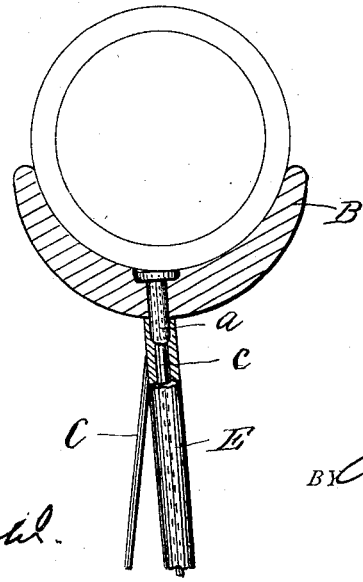

Figure 1 is a side view of a part of a wheel with parts broken away to show construction. Fig. 2 is a detail sectional view. Fig. 3 is a cross-section of the wheel.

The object of this invention is to provide vehicle-wheels having features of novelty and advantage, and has particular reference to means for preventing the buckling of the wheels. To accomplish this object, I make use of what may be called "compression-spokes," which are used in connection with the ordinary tension-spokes.

My invention is applicable to the wire wheels which are made in the ordinary manner, having the hub A, the rim B, and the spokes C, which are drawn taut by nipples $a$ in the ordinary manner. In carrying out my invention I make use of a series of tubular spokes E, through each of which passes a wire tension-spoke. This tubular spoke is reamed out at one end, so that it will fit about the nipple. At the opposite end it fits within a recess G in the hub. The number of the tubular compression-spokes used is not material, but preferably every other tension-spoke on each side of the wheel carries one of the tubular compression-spokes. By this construction it is seen that the wheel is trued up and held in proper condition by the tension-spokes, as in the ordinary and well-known manner; but the ordinary wire wheel is very liable to buckle and be thrown out of true. By the introduction of what I have termed the "compression-spokes" this tendency to buckle is overcome, for the reason that it is necessary to crush one of the tubular spokes before the wheel can buckle. These wheels are designed particularly for use in racing-sulkies and road-wagons; but it is clear that the improvement can be used in connection with any wire wheel.

I claim as my invention—

1. The combination in a wire wheel with the tension-spokes, of tubular compression-spokes extending from the rim to the ends of the hub, each compression-spoke surrounding a single tension-spoke, substantially as described.

2. The combination in a wire wheel with the tension-spokes reaching from the rim to the ends of the hub, of tubular metallic compression-spokes, each surrounding a single tension-spoke, said hub being recessed to receive the ends of the compression-spokes, substantially as described.

In testimony whereof I affix my signature in presence of two witnesses.

JOHN F. BARNETT, JR.

Witnesses:
HARTLEY C. CASE,
LOUIS G. ALLEN.